United States Patent
Smith et al.

(10) Patent No.: US 6,901,677 B2
(45) Date of Patent: Jun. 7, 2005

(54) METHOD AND APPARATUS USING A CLOSED LOOP CONTROLLED ACTUATOR FOR SURFACE PROFILOMETRY

(75) Inventors: Stuart T. Smith, Charlotte, NC (US); Marcin B. Bauza, Charlotte, NC (US); Pavan Jain, Charlotte, NC (US); Shane C. Woody, Charlotte, NC (US)

(73) Assignee: University of North Carolina at Charlotte, Charlotte, NC (US)

( * ) Notice: Subject to any disclaimer, the term of this patent is extended or adjusted under 35 U.S.C. 154(b) by 0 days.

(21) Appl. No.: 10/839,384

(22) Filed: May 5, 2004

(65) Prior Publication Data

US 2004/0221465 A1 Nov. 11, 2004

Related U.S. Application Data

(60) Provisional application No. 60/467,425, filed on May 5, 2003.

(51) Int. Cl.$^7$ .............................. G01B 5/20; G01B 7/28
(52) U.S. Cl. ........................................... 33/551; 33/556
(58) Field of Search .................. 33/503, 504, 551, 33/556, 558, 559, 561

(56) References Cited

U.S. PATENT DOCUMENTS

| | | | | |
|---|---|---|---|---|
| 4,513,507 A | * | 4/1985 | Laskowski | 33/556 |
| 4,778,313 A | * | 10/1988 | Lehmkuhl | 33/559 |
| 4,910,446 A | * | 3/1990 | McMurtry et al. | 33/503 |
| 5,189,806 A | | 3/1993 | McMurtry et al. | 33/503 |
| 6,327,788 B1 | | 12/2001 | Seddon et al. | 33/551 |
| 6,519,860 B1 | * | 2/2003 | Bieg et al. | 33/503 |
| 6,668,466 B1 | * | 12/2003 | Bieg et al. | 33/503 |
| 6,707,230 B2 | | 3/2004 | Smith et al. | 310/316.01 |
| 2003/0079358 A1 | * | 5/2003 | Nai et al. | 33/503 |

* cited by examiner

Primary Examiner—G. Bradley Bennett
(74) Attorney, Agent, or Firm—Kennedy Covington Lobdell & Hickman, LLP

(57) ABSTRACT

An apparatus for profiling the surface of a workpiece, including a probe adapted to make contact with the surface of a workpiece, a sensor for determining or deriving the force between the probe and the workpiece surface, an actuator that adjusts the position of the probe along an axis, which is generally perpendicular to the surface of the workpiece, in order to maintain a constant force between the probe and the surface, and a closed control loop, including a controller that controls the operation of the actuator based on information from the sensor.

30 Claims, 5 Drawing Sheets

METHOD AND APPARATUS USING A CLOSED LOOP CONTROLLED ACTUATOR FOR SURFACE PROFILOMETRY

CROSS-REFERENCE TO RELATED APPLICATION

This application is entitled to the benefit of, and claims priority to provisional U.S. patent application Ser. No. 60/467,425 filed May 5, 2003 and entitled "METHOD OF AND APPARATUS FOR EMPLOYING A CLOSED LOOP CONTROLLED ACTUATOR FOR SURFACE PROFILOMETRY," the entirety of which is incorporated herein by reference.

BACKGROUND OF THE PRESENT INVENTION

1. Field of the Present Invention

The invention relates generally to the field of precision motion control, and, in particular, to the ability to measure workpiece form error and surface finish.

2. Background

In general, the use of instruments for profiling the surface of a workpiece, often referred to as "profilometry," represents a crucial method or apparatus for extracting precision measurement of surface parameters. In particular, profilometry is used to measure a workpiece's profile or surface finish. Due to the accuracies of these instruments, parts are measured to assess their compliance with specification requirements and the manufacturing process is adjusted accordingly to reduce the scrap of parts. In other words, surface profilometry is a tool to maintain quality of parts produced within the manufacturing process.

On common type of profiling instrument is a contact based stylus sensor. For example, in U.S. Pat. No. 6,327,788, a stylus is traversed about a cylindrical surface and the deflection of the stylus is measured. In this arrangement, the deflection is caused by the spatial interaction between the stylus tip and the surface of the workpiece. For example, a change in local slope or surface roughness will change the deflection of the stylus. Unfortunately, although this method provides accurate measurements, its scanning speed is limited due to the low resonating behavior of the stylus or the high inertia of the scanning apparatus. The slow scanning speed, in turn, results in slower production cycles, potentially increased scrap and increased cost for each item being produced. Furthermore, designing an instrument similar to the stylus, but with a higher resonant frequency, may result in a less sensitive device with the inherent inability to measure small features. In addition, the contact force between the stylus and the surface varies because of the spring force that is needed to keep the stylus in contact with the surface.

Various attempts have been made to speed up the surface inspection process. For example, in U.S. Pat. No. 5,189,806, a scanning head is translated, relative to a workpiece, along an axis while a probe or stylus mounted on the scanning head is oscillated from side to side. This permits an entire area ("A") to be scanned on one pass of the scanning head. As a result, the entire surface area of a workpiece could be scanned with fewer time-consuming repositioning movement of the scanning head, thereby reducing the overall amount of time required to process a workpiece. Unfortunately, the speed of the scanning process itself was still limited for reasons similar to that of the approach of U.S. Pat. No. 6,327,788. U.S. Pat. No. 5,189,806 requires the use of electric motors and air bearings, devices that once again demonstrate low resonating behavior and high inertia.

One significant factor inhibiting the scanning speed in known approaches is the failure of prior approaches to maintain a constant force between the probe and the surface of the workpiece. For example, U.S. Pat. No. 5,189,806 generally relies on a constant torque at the drive motor to derive a constant normal load in a direction tangential to the axis of rotation of the motor upon which the probe is mounted. Although that patent apparently recognizes the utility of including a strain gage or other force monitoring means for detecting deformations of the probe, it does not disclose any means for using such force measurements to control the probe itself.

Not only does this lack of a feedback control loop limit the scanning speed in and of itself, but in addition, running the motor at constant force inherently limits the stiffness of the system. In this case, the stiffness of the probe is predominantly due to contact between the probe tip and solid surface. This will clearly vary from material to material as well as with surface geometry. Thus, a need exists for a system in which the dynamics are obtained from the probe itself, therefore enabling scanning at arbitrary forces and being little changed when measuring soft specimens.

In addition, circular features (i.e. inner diameters and outer diameters) are of significant concern within the field of profilometry. For example, optical fiber connectors often consist of a cylindrical ferrule with a small hole into which the optical fiber is bonded. Because the bore diameter of the ferrule is typically very small (typically only a small fraction of a millimeter), prior art scanning instruments cannot enter the holes to measure the internal surface profile. Additional examples of circular features requiring surface profiling may include cylinder bores, riveted holes for aerospace, hydraulic spool valve housings, injectors, fiber optic coupling and bearings. Thus, a particular need exists for a method and apparatus for profiling small circular surfaces.

SUMMARY OF THE PRESENT INVENTION

This present invention comprises a methodology for rapidly and accurately scanning a surface profile using a closed loop control method employing an actuator based drive mechanism and a sensor probe that can measure displacement of the probe tip in a generally vertical direction as it is pressed against the specimen surface. The closed loop includes a controller that operates to maintain the probe tip in contact with the surface at a defined force. Another sensor is provided to measure the resultant displacement of the actuator itself, thereby deriving data about the surface of the profile which is coordinated with additional location data indicative of the location on the workpiece for which the displacement of the actuator was measured. Together, the actuator displacement data and the location data provide a representation of the surface of the workpiece.

Broadly defined, the present invention according to one aspect includes an apparatus for profiling the surface of a workpiece, including: a probe adapted to make contact with the surface of a workpiece; at least one sensor that determines the current interaction force between the probe and the surface of the workpiece; an actuator that adjusts the future position of the probe along an axis that is generally perpendicular to the surface of the workpiece in order to maintain the future interaction force between the probe and the surface of the workpiece generally constant; and a closed feedback loop that controls the actuator to adjust the future position of the probe along the generally perpendicular axis at least partially on the basis of the current interaction force between the probe and the surface of the workpiece.

In features of this aspect, the at least one sensor determines the interaction force between the probe and the surface of the workpiece by determining the current position of the probe along the generally perpendicular axis; the probe, the at least one sensor and the actuator are supported on a platform, and at least one of the platform and the workpiece may be translated with respect to the other such that the probe moves across the surface of the workpiece; the at least one sensor generates a signal representative of the current position of the probe along the generally perpendicular axis, the signal generated by the at least one sensor is compared to a reference signal, and the actuator adjusts the future position of the probe along the generally perpendicular axis based on the comparison; the at least one sensor includes a contact-based sensor; the contact-based sensor is selected from the group consisting of resonant probes based on contact interactions or flexure probes that utilize distortion under applied loads in which distortions are measured using capacitance sensors, inductance sensors, strain gages, optical sensors, piezoelectric sensors, piezoresistive sensors, linear variable differential transformers (LVDT) and ultrasonic-based sensors; the at least one sensor includes a non-contact-based sensor; the non-contact-based sensor is selected from the group consisting of capacitive sensing sensors, interferometers, optical interferometers, ultrasonic, tunneling and resonant probes and the like sensing near-contact phenomena such as air squeeze films, eddy currents, magnetic waves, gas or liquid pressures or electrostatic charges; the result of the comparison of the signal generated by the at least one sensor to the reference signal is combined with a signal representative of movement by the actuator along the generally perpendicular axis; the apparatus further includes a controller that controls the actuator at least partially on the basis of the current position of the probe along the generally perpendicular axis; and the controller is a proportional-integral-differential controller.

In other features of this aspect, the at least one sensor is at least one first sensor, and the apparatus further comprises at least one second sensor that detects movement by the actuator along the generally perpendicular axis; the apparatus further includes a stage connecting the probe to the actuator, and the at least one second sensor detects displacement of the stage and produces an output, corresponding to the detected displacement of the stage, that is representative of a characteristic of the surface of the workpiece at a given point; the apparatus further includes a device that produces a trace of the outputs of the at least one second sensor in conjunction with the respective relative positions of the probe as the probe moves across the surface of the workpiece and the at least one second sensor detects the displacement of the stage at a plurality of given points on the workpiece; the actuator is interconnected with the stage via a flexure-based guiding mechanism; the actuator is a fine actuator, having a narrow range of motion, and is selected from the group consisting of a piezoelectric actuator device, a linear motor, and a voice coil actuating device; the actuator is a first actuator, and the apparatus further comprises a second actuator, under the control of the closed feedback loop, that adjusts the future position of the probe along the generally perpendicular axis; the first actuator is a fine actuator, having a narrow range of motion, and the second actuator is a coarse actuator, having a long range of motion; the apparatus further includes first and second controllers that control the first and second actuators, respectively, at least partially on the basis of the current position of the probe along the generally perpendicular axis, and the second controller further controls the second actuator at least partially on the basis of the output of the first controller; and the at least one sensor is at least one first sensor, and the apparatus further includes at least one second sensor and at least one third sensor that detect movement by the first and second actuators, respectively, along the generally perpendicular axis.

The present invention according to another aspect is a method of gathering data related to the surface of a workpiece, including: placing a probe in contact with the surface of a workpiece; determining, via at least one sensor, the current interaction force between the probe and the surface of the workpiece; and at least partially on the basis of the current position of the probe, adjusting, via an actuator, the future position of the probe along an axis that is generally perpendicular to the surface of the workpiece in order to maintain the future interaction force between the probe and the surface of the workpiece generally constant.

In features of this aspect, determining the interaction force between the probe and the surface of the workpiece includes determining the current position of the probe along the generally perpendicular axis; the method further includes supporting the probe, the at least one sensor and the actuator on a platform, and translating at least one of the platform and the workpiece with respect to the other such that the probe moves across the surface of the workpiece; the method further includes generating, via the at least one sensor, a signal representative of the current position of the probe along the generally perpendicular axis, comparing the signal generated by the at least one sensor is to a reference signal, and adjusting, via the actuator, the future position of the probe along the generally perpendicular axis based on the comparison; the at least one sensor is at least one first sensor, and the method further includes detecting, via at least one second sensor, movement by the actuator along the generally perpendicular axis; detecting includes detecting movement of a stage connecting the probe to the actuator, and the method further includes detecting, via the at least one second sensor, displacement of the stage; and producing, via the at least one second sensor, an output, corresponding to the detected displacement of the stage, that is representative of a characteristic of the surface of the workpiece at a given point; the method further includes producing a trace of the outputs of the at least one second sensor in conjunction with the respective relative positions of the probe as the probe moves across the surface of the workpiece and the at least one second sensor detects the displacement of the stage at a plurality of given points on the workpiece; the surface of the workpiece is a planar surface or a curvilinear surface such as a cylindrical or elliptical surface; and the method further includes maintaining the actuator within its operating range based on the translating step.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS

Figure 1:
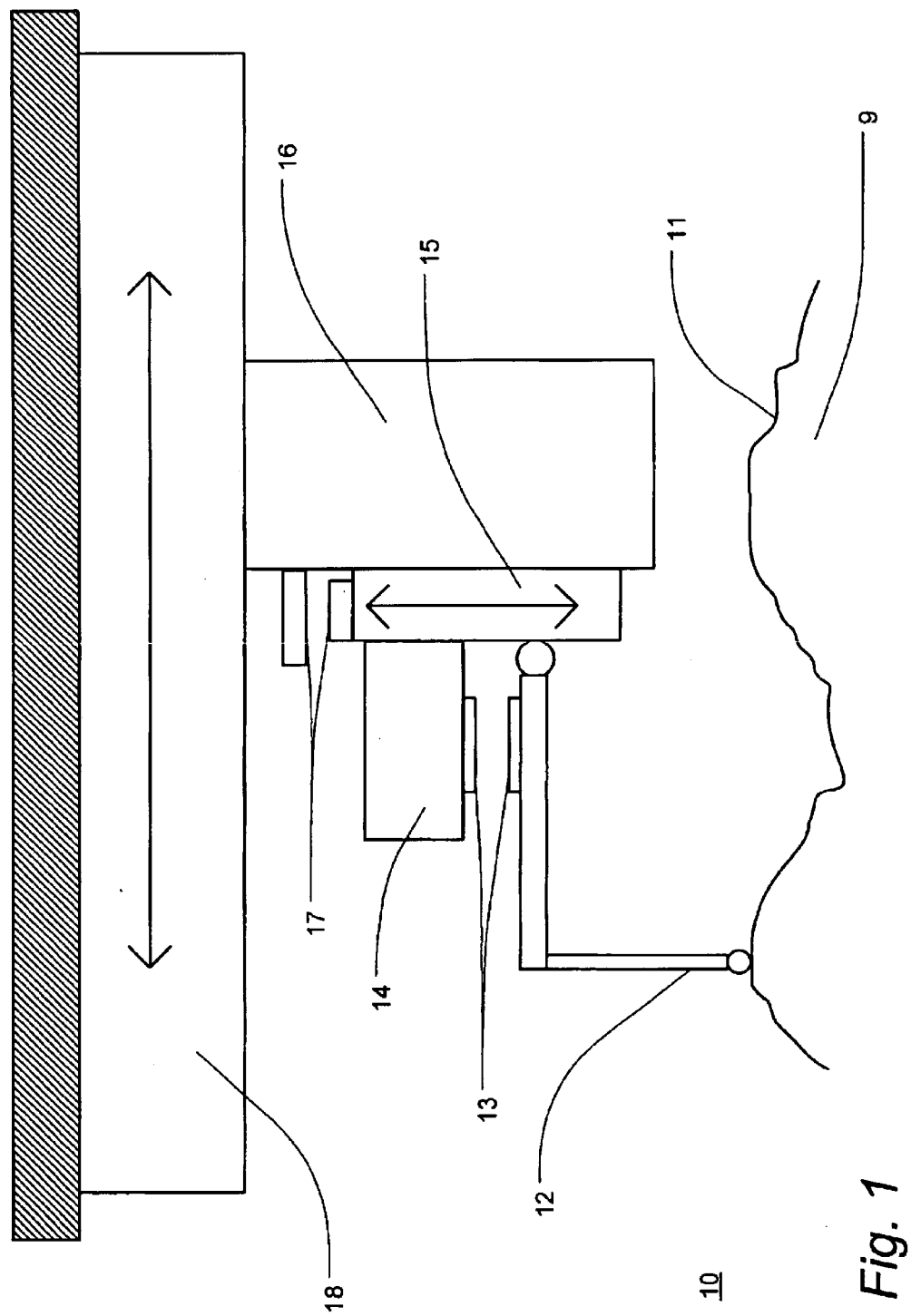
FIG. 1 is a cross-sectional schematic view of a first exemplary apparatus using a closed loop controlled actuator for surface profilometry, suitable for use in a preferred embodiment of the present invention.

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a cross-sectional schematic view of a first exemplary apparatus 10 using a closed loop controlled actuator for surface profilometry, suitable for use in a preferred embodiment of the present invention. The apparatus 10 includes a probe 12, first and second sensors 13, 17, first and second frames 14, 16 and first and second stages 15, 18. The probe 12 is mounted on the first stage 15 and arranged to deflect with respect to the first stage 15 and the first frame 14, which is rigidly attached to the first stage 15. The first sensor 13 is disposed between the probe 12 and the first frame 14 and arranged to measure the deflection of the probe 12 relative to the first frame 14. When suitably calibrated, the output of the first sensor 13 is a signal from which the contact force between the tip of the probe 12 and a surface 11 of a workpiece 9 may be determined.

One type of sensor suitable for use with the preferred embodiments of the present invention is a capacitance gauge, but it will be apparent that the first sensor 13 may instead be any type of non-contact-or contact-based sensor. Non-contact-based sensors include, but are not limited to, capacitive sensing sensors, interferometers, optical interferometers, ultrasonic, tunneling and resonant probes and the like sensing near-contact phenomena such as air squeeze films, eddy currents, magnetic waves, gas or liquid pressures or electrostatic charges. Contact-based sensors include, but are not limited to, resonant probes based on contact interactions or flexure probes that utilize distortion under applied loads in which distortions are measured using capacitance sensors, inductance sensors, strain gages, optical sensors, piezoelectric sensors, piezoresistive sensors, linear variable differential transformers (LVDT) or ultrasonic-based sensors.

The first stage 15 is adjustably mounted on the second frame 16, which in turn is supported by the second stage 18. The second sensor 17, which likewise may be a capacitance gauge or any of a wide variety of other types of sensor, is disposed between the first stage and either the second stage 18 or the second frame 16 and arranged to measure the displacement of the first stage 15 relative to the second stage 18 or the second frame 16, respectively. The first stage 15 is preferably connected to the second frame 16 by one or more flexure-based guiding mechanisms (not shown) and driven by an actuator 23 (shown functionally in FIG. 2). The actuator 23 may be any suitable high frequency, low inertia actuating mechanism, including but not limited to piezoelectric ceramic (i.e., PZT, PMN) actuating devices, actuating devices using single crystals of piezoelectric materials (i.e., PMN-PT, PZN-PT), linear motors or voice coil actuating devices. Flexure-based actuator devices and closed loop control systems therefor that are suitable for use with the preferred embodiments of the present invention are described in commonly-assigned U.S. Pat. No. 6,707,230, the entirety of which is incorporated herein by reference.

In use, the profile of the surface 11 of the workpiece 9 is measured using the probe 12. The surface 11 may take on any of a wide variety of shapes, including without limitation planar or linear, circular, cylindrical, elliptical, and the like. The probe 12 is moved along the surface 11 by translating the second stage 18 relative to the workpiece 9. Translation may be achieved by moving the second stage 18, the workpiece 9, or both. As the probe 12 is translated relative to the surface 11, the probe 12 deflects due to the change in force between the probe 12 and the surface profile 11. The deflection in the probe 12 is measured with the first sensor 13 relative to the first frame 14, and the signal produced by the first sensor 13 is controlled to be at a desired constant value by employing the first stage 15 as a means to maintain zero steady state error. The error is the difference between the desired force value for the first sensor 13 and the actual force value as determined by the sensor 13. This strategy will maintain a constant force between the probe tip 12 and the surface 11. Moreover, the probe tip 12 will generate a constant mechanical deflection as measured at the first sensor 13 as the second stage 18 is translated along the length of the surface 11 and the probe 12 is scanned across the surface 11.

The surface 11 is measured by employing the second sensor 17 to measure the displacement of the first stage 15 relative to the second stage 18 or the second frame 16. The second stage 18 includes a displacement sensor (not shown) to determine the traversed location of the probe 12 with respect to surface 11. The second sensor 17 provides the height of the probe 12 while the surface 11 is scanned. The second sensor 17 and the displacement of the second stage 18 provide a method to extract surface parameters. Because the probe 12 maintains a generally constant deflection relative to the first frame 14, the signal range over which the first sensor 13 is required to operate is relatively small. As a result, the probe 12 may be designed with an increased stiffness and high natural frequency. Generally, this method would be incapable of measuring large features without employing the first stage 15 in closed loop feedback. However, the first stage 15 provides a method to measure larger feature sizes while the probe 12 is designed with a high natural frequency. The second limitation is the natural frequency of the first stage 15. However, because the first stage 15 is a flexure-based, actuator-driven stage, it may be designed with a high bandwidth response. Additionally, the probe 12, the first sensor 13, the first frame 14 and the first stage 15 platform may be compactly designed. Consequently, the scanning mechanism may have a low inertia to provide higher measurement bandwidth.

Figure 2:
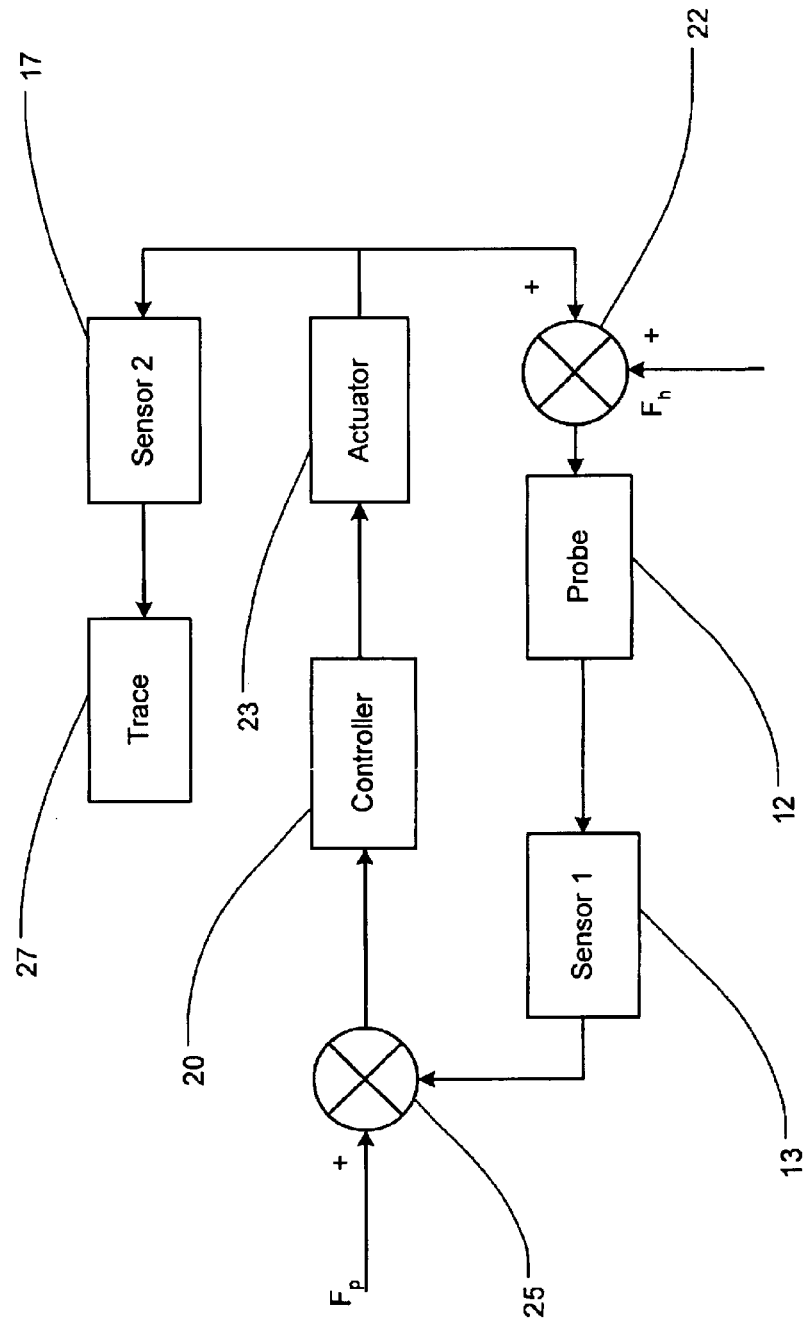
FIG. 2 is a block diagram of a generalized actuator-based closed loop control system for use with the apparatus of FIG. 1.

FIG. 2 is a block diagram of a generalized actuator-based closed loop control system 19 for use with the apparatus 10 of FIG. 1. The closed loop control system 19 includes a comparator 25, a controller 20, an actuator 23 for the first stage 15 of the apparatus 10, the probe 12, the first and sensors 13, 17, and a device 27 for producing a trace. As shown in FIG. 2, a reference signal, labeled $F_p$ (which may or may not be constant), is compared to a feedback signal in the comparator 25 and the output error is transferred into the controller 20. Controllers suitable for use with the preferred embodiments of the present invention may include integral controllers, proportional-integral controllers, proportional-integral-differential ("PID") controllers, lead-lag controllers, or other controller strategies, the design and implementation of which would be apparent to one of ordinary skill in the art.

The output signal from the controller 20 is transferred to the actuator 23, which adjusts the position of the first stage 15 and in turn affects the position of the probe 12. In addition, however, as the probe 12 scans across the surface 11, the surface interaction generates an externally applied force, labeled $F_h$, on the probe 12. Thus the actual position of the probe 12 is affected by the combination of the two factors, as shown schematically by the additive element 22. Changes in the position of the probe 12 are detected by the first sensor or capacitance gauge 13 as described previously. The signal from the capacitance gauge 13 is transferred back into the comparator 25 where it is compared with the reference signal $F_p$. The difference between the desired signal $F_p$ and the output of the first gauge 13 is the error signal, which is generated as an output of the comparator 25. Thus, the actuator 23 continues to change in displacement to maintain the probe output signal, which is a measure of the contact forces between the probe tip 12 and the surface 11, to be the same as the reference signal $F_p$, thereby following as closely as possible the specimen surface profile. Meanwhile, the second sensor 17 is used to monitor the displacement of the first stage 15 caused by the actuator 23. The signal from the second sensor 17 is generated as a trace by the trace device 27.

Although not shown in FIG. 2, it should be apparent that the inputs to the comparator 25 and/or the additive element 22 may be scaled by some desired factor. Normally, the inputs will be scaled by the same proportionate amount. However, the relative scaling of inputs can be different in some cases. In fact, in the extreme case, one input may be reduced to an insignificant value with respect to the other, in which case the sum or difference of the two inputs would be effectively equal to the input which is not attenuated.

The first sensor 13 may be calibrated with respect to the reference value $F_p$. In this case, a load cell would be used to apply a known force to the probe tip 12, and the signal from the first sensor 13 is calibrated with respect to the known force. Similarly, the second sensor 17 may be calibrated with respect to a known displacement (i.e. Michelson interferometer or any other suitable linear or rotational scale).

Figure 3:
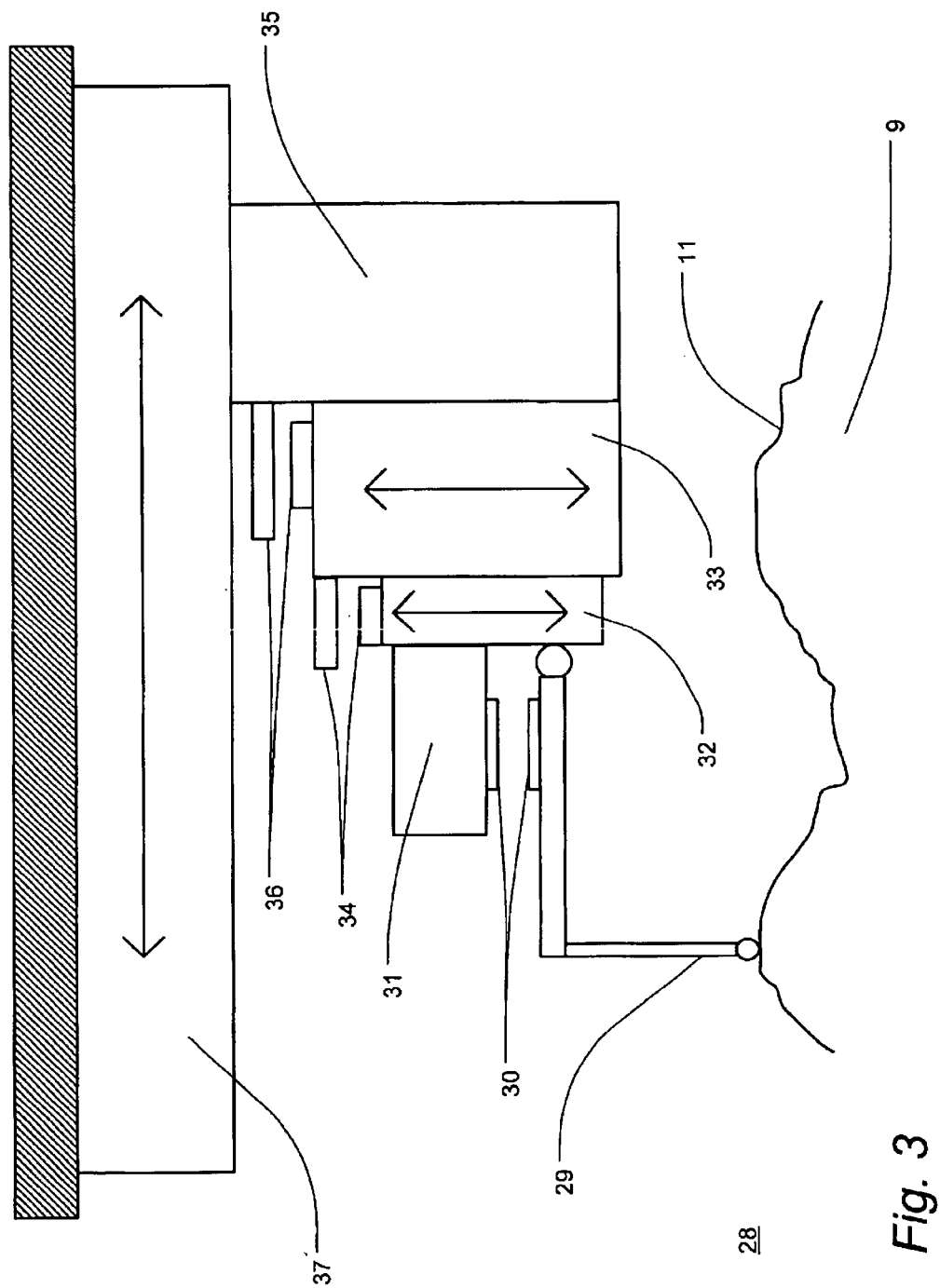
FIG. 3 is a cross-sectional schematic view of a second exemplary apparatus using a closed loop controlled actuator for surface profilometry, suitable for use in a preferred embodiment of the present invention.

The actuator based apparatus may also be employed to measure surface parameters, such as peaks and valleys, with high precision over large ranges of variation. FIG. 3 is a cross-sectional schematic view of a second exemplary apparatus 28 using a closed loop controlled actuator for surface profilometry, suitable for use in a preferred embodiment of the present invention. The apparatus 28 includes a probe 29, first, second and third sensors 30, 34, 36, first and second frames 31, 35 and first, second and third stages 32, 33, 37. The probe 29 is mounted on the first stage 32 and arranged to deflect with respect to the first stage 32 and the first frame 31, which is rigidly attached to the first stage 32. The first sensor 30, which once again may be a capacitance gauge, is disposed between the probe 29 and the first frame 31 and arranged to measure the deflection of the probe 29 relative to the first frame 31. The first stage 32 is adjustably mounted on the second stage 33. The second stage 33 is supported by the second frame 35, which in turn is adjustably mounted on the third stage 37. The second sensor 34, which likewise may be a capacitance gauge, is disposed between the first stage 32 and the second stage 33 and arranged to measure the displacement of the first stage 32 relative to the second stage 33. Similarly, the third sensor 36, which likewise may be a capacitance gauge, is disposed between the second stage 33 and either the third stage 37 or the second frame 35 and arranged to measure the displacement of the second stage 33 relative to the third stage 37 or the second frame 35, respectively.

Figure 4:
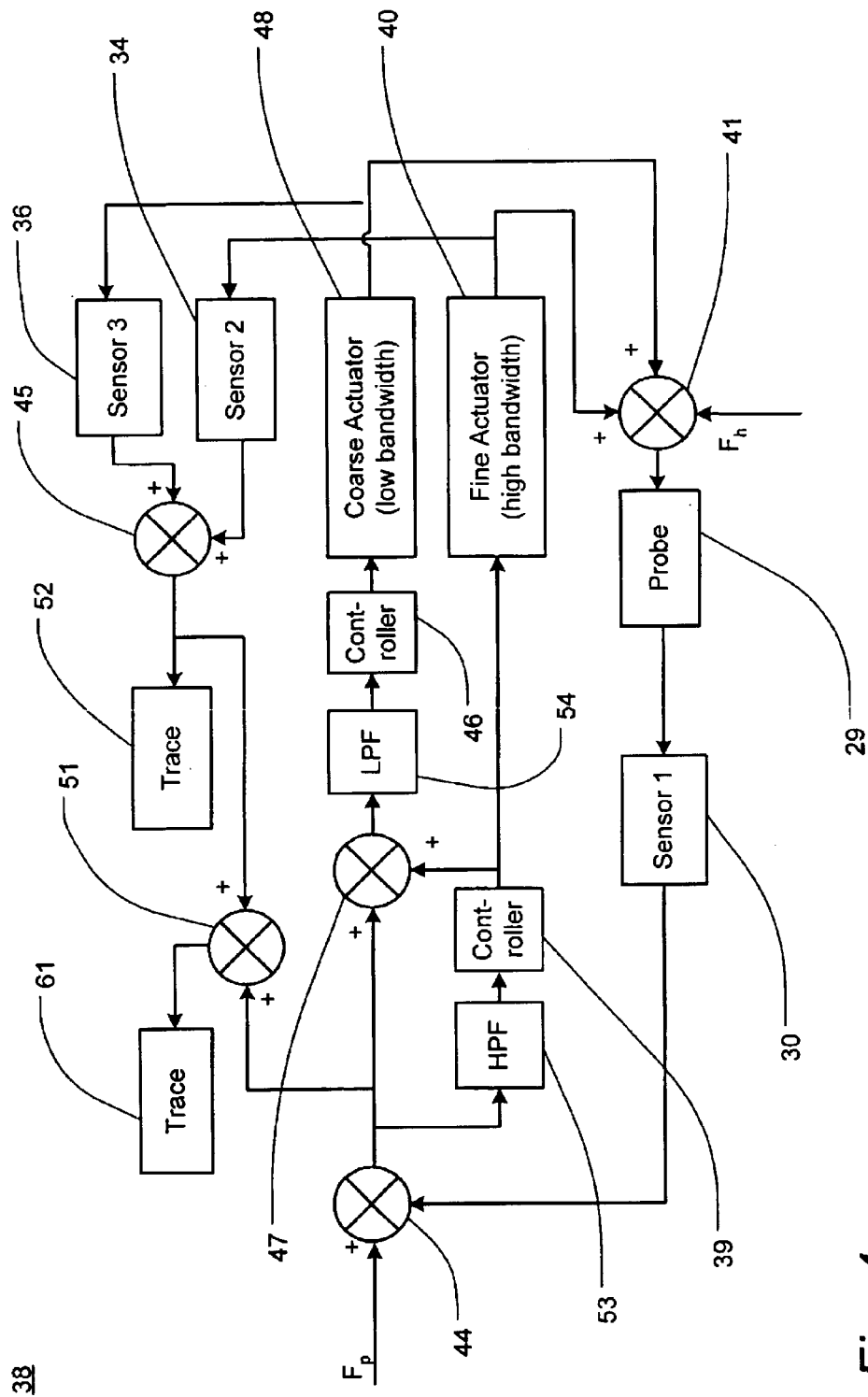
FIG. 4 is a block diagram of a generalized actuator-based closed loop control system for use with the apparatus of FIG. 3.

In use, the profile of the surface 11 of the workpiece 9 is measured using the probe 29. The surface 11 may again take on any of a wide variety of shapes, including without limitation planar or linear, circular, cylindrical, elliptical, and the like. The probe 29 is moved along the surface 11 by translating the third stage 37 relative to the workpiece 9. Once again, translation may be achieved by moving the third stage 37, the workpiece 9, or both. As the probe 29 is translated relative to the surface 11, the probe 29 deflects due to the change in force between the probe 29 and the surface profile 11. The deflection in the probe 29 is measured with the first sensor 30 relative to the first frame 31, and the signal produced by the first sensor 30 is controlled to be at a desired constant value by employing the first and second stages 32, 33 as a means to maintain zero steady state error. The first and second stages 32, 33 are each controlled using a closed loop controller 38, as shown in FIG. 4, but the two stages serve slightly different purposes. Typically, the first stage 32, on which the probe 29 is mounted, will be limited in range but designed with a high bandwidth. On the other hand, the second stage 33 is employed to control at a low bandwidth across the surface 11 with a long range of motion.

Depending upon the local slope change or gradient with respect to velocity of scanning using the third or translation stage 37, the first and second stages 32, 33 will be employed with an appropriate controller strategy to rapidly measure the change in local slopes regardless of whether the slope changes rapidly or slowly and regardless of whether the magnitude of change is large or small. For example, during a scan, the probe tip 29 may encounter a steep slope with respect to the scan velocity. Generally, because of its low bandwidth, the second stage 33 may not be able to respond quickly enough to maintain an applied force of constant magnitude. However, with its high bandwidth, the first stage 32 can respond at sufficient speed to further move the probe 29 to maintain a constant force. The complete workpiece profile trace is dependent upon the combined sum of the second and third sensors 34, 36.

In another example, the combination of both the first and second stages 32, 33 and their respective controllers 39, 46 (described hereinbelow) may not be adequate to follow very rapidly changing small surface features. In this case, if the probe tip 29 is of sufficient bandwidth, such as may be obtained if the probe tip is a sharp stylus, a nanotube, or a nanowhisker, its deviations will represent the very fine surface features often referred to as surface finish, while higher frequency variations of the motion of the tip may be used as a measure of surface form. In this case the surface finish features will show up in the error signal that is being fed into the controller. Although these features would not be measured at constant force, they might still be representative of surface deviations so that a complete surface profile including all wavelengths of the measurement would be represented by the sum of the three sensors 30, 34 and 36 in FIG. 3.

FIG. 4 is a block diagram of a generalized actuator-based closed loop control system 38 for use with the apparatus 28 of FIG. 3. The closed loop control system 38 includes a comparator 44, first and second controllers 39, 46, fine and coarse adjustment actuators 40, 48 for the first and second stages 32, 33 respectively, the probe 29, the first, second and third sensors 30, 34 and 36, first, second and third adders 45, 47, 51 and one or more devices 52, 61 for producing traces. In addition, although optional, the system 38 preferably includes a high pass filter ("HPF") 53 and a low pass filter ("LPF") 54. As shown in FIG. 4, a reference signal, labeled $F_p$ (which may or may not be constant), is compared to a feedback signal in the comparator 44 and the output error is transferred into the two filters 53, 54. The higher frequency component of the output from the comparator 44 is simultaneously transmitted by the optional high pass filter HPF 53 and the first controller 39 into the fine adjustment actuator 40. Meanwhile, the lower frequency component of the output from the comparator 44 is transmitted by the optional LPF 54 and the second controller 46 into the coarse adjustment actuator 48. Once again, controllers suitable for use with the preferred embodiments of the present invention may include integral controllers, proportional-integral controllers, PID controllers, lead-lag controllers, or other controller strategies, including advanced non-linear controller strategies, the design and implementation of which would be apparent to one of ordinary skill in the art. The output of the first controller 39 is also summed with the error signal to the second controller 46 as a means of maintaining the fine adjustment actuator 40 close to a desired operating point, typically at the center of its range of response. In principle, a single sensor could be used to measure the relative displacement between the probe 29 and the second frame 35. This single sensor would then produce the same signal as that provided by the comparator 44.

Because the probe 29 is supported by both the first and second stages 32, 33, the position of the probe 29 is controlled directly or indirectly by the output signals of both of the actuators 40, 48. The output of the fine adjustment actuator 40 controls the position of the first stage 32, while the output of the coarse adjustment actuator 48 controls the position of the second stage 33 which in turn affects the position of the first stage 32. In addition, however, as the probe 29 scans across the surface 11, the surface interaction generates an externally applied force, labeled $F_h$, on the probe 29. Thus the actual position of the probe 29 is affected by the combination of the three factors, as shown schematically by the additive element 41.

In similar fashion to the operation of the first exemplary apparatus 10, changes in the position of the probe 29 are detected by the first sensor or capacitance gauge 30 as described previously. The signal from the capacitance gauge 30 is transferred back into the comparator 44 where it is compared with the reference signal $F_p$. The difference between the desired signal $F_p$ and the output of the first gauge 30 is the error signal. Thus, the actuators 40, 48 continue to change in displacement to maintain the output signal as the reference signal $F_p$, thereby following as closely as possible the specimen surface profile. In operation, the actuators 40, 48 respond to a sudden disturbance in the probe tip 29 such as a large gradient change with respect to constant scanning velocity. The second adder 47 slowly (i.e. at a rate less than the limiting bandwidth of the second stage 33 and coarse adjustment actuator 48) brings the high frequency first stage 32 back to an operating position in its mid-range by moving the low frequency second stage 33 to remove the net, or average, movement of the high frequency first stage 32.

Meanwhile, the second sensor 34 is used to monitor the displacement of the first stage 32 caused by the fine adjustment actuator 40, while the third sensor 36 is used to monitor the displacement of the second stage 33 caused by the coarse adjustment actuator 48. The output signals from the second and third sensors 34, 36 are combined in the first adder 45, and the output signal from the first adder 45 is generated as a trace by the first trace device 52. Using the third adder 51, the same output signal may also be combined with the error signal produced by the comparator 44 to produce an additional output signal than can include all measured displacement components. Thus, with this method, the various frequencies of the surface profile can be combined arbitrarily to best suit the needs of the user of this system. Techniques of separating these different features of a surface profile are well known in the art.

Figure 5:
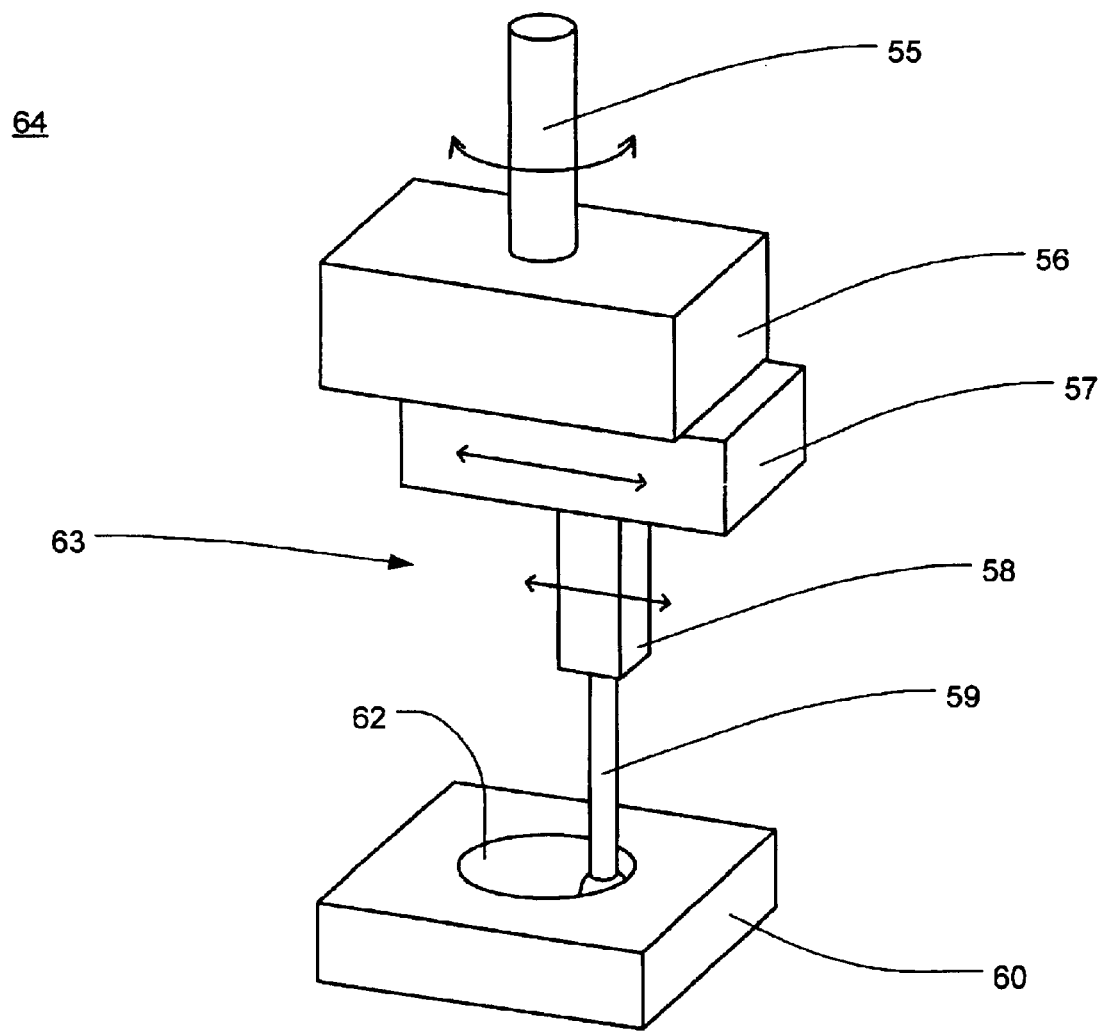
FIG. 5 is a cross-sectional schematic view of a third exemplary apparatus using a closed loop controlled actuator for circular surface profilometry, suitable for use in a preferred embodiment of the present invention.

The same general approach described hereinabove may also be used to measure circular features of varying scale. FIG. 5 is a cross-sectional schematic view of a third exemplary apparatus 64 using a closed loop controlled actuator for circular surface profilometry, suitable for use with a preferred embodiment of the present invention. This apparatus 64 includes a shaft 55, a rigid frame 56 and a scanning unit 63. The scanning unit includes a coarse adjustment stage 57, an actuator stage 58 attached directly to the coarse adjustment stage, and a probe-sensor 59 that is rigidly attached to the actuator stage. The scanning unit 63 is attached to the rigid frame 56, which is connected in turn to the shaft 55, which may be a rotating spindle.

In use, the probe-sensor 59 is placed in contact with the inside diameter of the circular feature 62. The coarse adjustment stage 57 is translated in this case until the probe-sensor 59 makes contact with the side wall of the circular feature 62. Next, the coarse adjustment stage 57 may be locked into place and the actuator stage 58 is employed to provide a constant applied force between the probe-sensor 59 and the workpiece 60. As with the sensors 13, 17 of the first apparatus 10, the coarse adjustment stage 57 contains a sensor (not shown) that measures the absolute displacement of the coarse adjustment stage 57 relative to the frame 56. While using a closed loop controller of the type described previously to apply a constant force, the shaft 55 is rotated 360° while the coarse adjustment stage 57 is monitored using a displacement sensor (not shown). The spindle 55 contains a rotary encoder (not shown) to determine the angular location of the probe 59. In this case, the displacement signal of the actuator stage 58 is plotted with respect to the angular location of the probe 59 to provide a circular plot of the deviations of the hole 62 from the rotary motion of the spindle 55. Assuming the spindle 55 is perfectly round and that the other components are calibrated properly, the deviations of the probe 59 would represent errors of the hole 62 from a perfect circular shape.

The actuator based stage is a crucial component in supplying a high bandwidth spatial measurement. Recently, ferroelectric actuators constructed from such materials as PMN-PT and PZN-PT have been explored and have demonstrated significant displacement range improvement when compared to conventional PZT actuators.

Various probes and sensors may be employed for this method and apparatus. Any conventional probe and sensor arrangement may be implemented wherein a spatial interaction between the probe 12, 29, 59 and workpiece 11, 60 is accurately measured. For example, this might include a force sensor, optical interferometry, capacitive-sensing, resonant tuning fork, piezoresistive cantilevers or electron tunneling. However, various types of detection sensing may be implemented to detect the interaction between the probe 12, 29, 59 and workpiece surface 11, 60.

Additionally, the systems mentioned above can be implemented by switching the locations of the probe and specimen. This would produce a system in which the specimen is controlled to maintain constant force as it is scanned over the stationary probe.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. An apparatus for profiling the surface of a workpiece, the apparatus comprising:
   a probe adapted to make contact with the surface of a workpiece;
   at least one sensor that determines the current interaction force between the probe and the surface of the workpiece;
   an actuator that adjusts the future position of the probe along an axis that is generally perpendicular to the surface of the workpiece in order to maintain the future interaction force between the probe and the surface of the workpiece generally constant; and
   a closed feedback loop that controls the actuator to adjust the future position of the probe along the generally perpendicular axis at least partially on the basis of the current interaction force between the probe and the surface of the workpiece.

2. The apparatus of claim 1, wherein the at least one sensor determines the interaction force between the probe and the surface of the workpiece by determining the current position of the probe along the generally perpendicular axis.

3. The apparatus of claim 2, wherein the probe, the at least one sensor and the actuator are supported on a platform, wherein at least one of the platform and the workpiece may be translated with respect to the other such that the probe moves across the surface of the workpiece.

4. The apparatus of claim 3, wherein the at least one sensor generates a signal representative of the current position of the probe along the generally perpendicular axis, wherein the signal generated by the at least one sensor is compared to a reference signal, and wherein the actuator adjusts the future position of the probe along the generally perpendicular axis based on the comparison.

5. The apparatus of claim 4, wherein the at least one sensor includes a contact-based sensor.

6. The apparatus of claim 5, wherein the contact-based sensor is selected from the group consisting of: resonant probes based on contact interactions or flexure probes that utilize distortion under applied loads in which distortions are measured using capacitance sensors, inductance sensors, strain gages, optical sensors, piezoelectric sensors, piezoresistive sensors, linear variable differential transformers (LVDT) and ultrasonic-based sensors.

7. The apparatus of claim 4, wherein the at least one sensor includes a non-contact-based sensor.

8. The apparatus of claim 7, wherein the non-contact-based sensor is selected from the group consisting of: capacitive sensing sensors, interferometers, optical interferometers, ultrasonic, tunneling and resonant probes and the like sensing near-contact phenomena such as air squeeze films, eddy currents, magnetic waves, gas or liquid pressures or electrostatic charges.

9. The apparatus of claim 4, wherein the result of the comparison of the signal generated by the at least one sensor to the reference signal is combined with a signal representative of movement by the actuator along the generally perpendicular axis.

10. The apparatus of claim 3, further comprising a controller that controls the actuator at least partially on the basis of the current position of the probe along the generally perpendicular axis.

11. The apparatus of claim 10, wherein the controller is a proportional-integral-differential controller.

12. The apparatus of claim 3, wherein the at least one sensor is at least one first sensor, and the apparatus further comprises at least one second sensor that detects movement by the actuator along the generally perpendicular axis.

13. The apparatus of claim 12, further comprising a stage connecting the probe to the actuator, wherein the at least one second sensor detects displacement of the stage and produces an output, corresponding to the detected displacement of the stage, that is representative of a characteristic of the surface of the workpiece at a given point.

14. The apparatus of claim 13, further comprising a device that produces a trace of the outputs of the at least one second sensor in conjunction with the respective relative positions of the probe as the probe moves across the surface of the workpiece and the at least one second sensor detects the displacement of the stage at a plurality of given points on the workpiece.

15. The apparatus of claim 13, wherein the actuator is interconnected with the stage via a flexure-based guiding mechanism.

16. The apparatus of claim 3, wherein the actuator is a fine actuator, having a narrow range of motion, and is selected from the group consisting of: a piezoelectric actuator device, a linear motor, and a voice coil actuating device.

17. The apparatus of claim 2, wherein the actuator is a first actuator, and wherein the apparatus further comprises a second actuator, under the control of the closed feedback loop, that adjusts the future position of the probe along the generally perpendicular axis.

18. The apparatus of claim 17, wherein the first actuator is a fine actuator, having a narrow range of motion, and the second actuator is a coarse actuator, having a long range of motion.

19. The apparatus of claim 18, further comprising first and second controllers that control the first and second actuators, respectively, at least partially on the basis of the current position of the probe along the generally perpendicular axis, and wherein the second controller further controls the second actuator at least partially on the basis of the output of the first controller.

20. The apparatus of claim 18, wherein the at least one sensor is at least one first sensor, and the apparatus further comprises at least one second sensor and at least one third sensor that detect movement by the first and second actuators, respectively, along the generally perpendicular axis.

21. A method of gathering data related to the surface of a workpiece, comprising:

placing a probe in contact with the surface of a workpiece;

determining, via at least one sensor, the current interaction force between the probe and the surface of the workpiece; and at least partially on the basis of the current position of the probe, adjusting, via an actuator, the future position of the probe along an axis that is generally perpendicular to the surface of the workpiece in order to maintain the future interaction force between the probe and the surface of the workpiece generally constant.

22. The method of claim 21, wherein determining the interaction force between the probe and the surface of the workpiece includes determining the current position of the probe along the generally perpendicular axis.

23. The method of claim 22, further comprising:

supporting the probe, the at least one sensor and the actuator on a platform; and translating at least one of the platform and the workpiece with respect to the other such that the probe moves across the surface of the workpiece.

24. The method of claim 23, further comprising:

generating, via the at least one sensor, a signal representative of the current position of the probe along the generally perpendicular axis;

comparing the signal generated by the at least one sensor is to a reference signal; and adjusting, via the actuator, the future position of the probe along the generally perpendicular axis based on the comparison.

25. The method of claim 23, wherein the at least one sensor is at least one first sensor, the method further comprising:

detecting, via at least one second sensor, movement by the actuator along the generally perpendicular axis.

26. The method of claim 25, wherein detecting includes detecting movement of a stage connecting the probe to the actuator, the method further comprising:

detecting, via the at least one second sensor, displacement of the stage; and producing, via the at least one second sensor, an output, corresponding to the detected displacement of the stage, that is representative of a characteristic of the surface of the workpiece at a given point.

27. The method of claim 26, further comprising:

producing a trace of the outputs of the at least one second sensor in conjunction with the respective relative positions of the probe as the probe moves across the surface of the workpiece and the at least one second sensor detects the displacement of the stage at a plurality of given points on the workpiece.

28. The method of claim 25, wherein the surface of the workpiece is a planar surface.

29. The method of claim 25, wherein the surface of the workpiece is a curvilinear surface such as a cylindrical or elliptical surface.

30. The method of claim 25, further comprising:

based on the translating step, maintaining the actuator within its operating range.

* * * * *